US007565335B2

(12) United States Patent
Tang et al.

(10) Patent No.: US 7,565,335 B2
(45) Date of Patent: Jul. 21, 2009

(54) TRANSFORM FOR OUTLIER DETECTION IN EXTRACT, TRANSFER, LOAD ENVIRONMENT

(75) Inventors: ZhaoHui Tang, Bellevue, WA (US); Donald M. Farmer, Woodinville, WA (US); C. James MacLennan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 11/375,850

(22) Filed: Mar. 15, 2006

(65) Prior Publication Data

US 2007/0239636 A1    Oct. 11, 2007

(51) Int. Cl.
*G06E 1/00* (2006.01)
(52) U.S. Cl. .......................... 706/20; 707/6
(58) Field of Classification Search .................. 706/20; 707/6
See application file for complete search history.

(56) References Cited

U.S. PATENT DOCUMENTS

| 5,832,182 | A  | * | 11/1998 | Zhang et al. ............ 706/50 |
| 5,933,818 | A  | * | 8/1999  | Kasravi et al. ............ 706/12 |
| 6,115,708 | A  |   | 9/2000  | Fayyad et al. |
| 6,260,036 | B1 |   | 7/2001  | Almasi et al. |
| 6,278,997 | B1 |   | 8/2001  | Agrawal et al. |
| 6,633,882 | B1 | * | 10/2003 | Fayyad et al. ............ 707/101 |
| 6,643,629 | B2 | * | 11/2003 | Ramaswamy et al. ......... 706/45 |
| 6,684,208 | B2 |   | 1/2004  | Kil et al. |
| 6,816,848 | B1 |   | 11/2004 | Hildreth et al. |
| 6,836,773 | B2 | * | 12/2004 | Tamayo et al. ............ 707/6 |
| 6,968,511 | B1 | * | 11/2005 | Robertson et al. ........... 715/835 |
| 7,092,941 | B1 | * | 8/2006  | Campos ................ 707/6 |
| 7,292,905 | B1 | * | 11/2007 | Durrant et al. ............ 700/108 |
| 2002/0059202 | A1 | * | 5/2002 | Hadzikadic et al. ............ 707/3 |
| 2002/0129038 | A1 |   | 9/2002 | Cunningham |
| 2002/0138492 | A1 |   | 9/2002 | Kil |
| 2002/0169735 | A1 |   | 11/2002 | Kil et al. |
| 2003/0065632 | A1 | * | 4/2003 | Hubey .................. 706/15 |
| 2004/0254768 | A1 |   | 12/2004 | Kim et al. |
| 2005/0021489 | A1 | * | 1/2005 | MacLennan et al. .......... 707/1 |
| 2005/0091189 | A1 |   | 4/2005 | Zhang |
| 2005/0114360 | A1 |   | 5/2005 | Russell et al. |
| 2005/0210027 | A1 | * | 9/2005 | Aggarwal et al. ............ 707/6 |

OTHER PUBLICATIONS

"Intelligent Miner for Data Applications Guide", Cabena et al, International Technical Support Organization, First edition, Mar. 1999, http://www.redbooks.ibm.com.*
D. Barbara, et al., "The New Jersey Data Reduction Report", Bulletin of the Technical Committee on Data Engineering, Dec. 1997, pp. 3-45, 43 pages, vol. 20, No. 4.

(Continued)

*Primary Examiner*—David R Vincent
*Assistant Examiner*—Mai T Tran
(74) *Attorney, Agent, or Firm*—Workman Nydegger

(57) ABSTRACT

Systems and methods that cleanse data in Extract, Transform, Load environments (ETL), via employing an outlier detect component that is positioned in data pipeline to data warehouse(s). Such outlier detect component employs a cluster mining model to split data into normal and outlier data. Different predictive models can be employed to detect outliers in different data slices to enhance the accuracy of the predictions. In addition, a graphical user interface (GUI) enables a user to interact with cluster groups that are created and/or analyzed by the outlier detect component.

20 Claims, 10 Drawing Sheets

OTHER PUBLICATIONS

C. Fraley, et al, "How Many Clusters? Which Clustering Method? Answers Via Model-Based Cluster Analysis", Tech. Rep. 329, Department of Statistics, University of Washington, 1998, 22 pages, Seattle, WA.

Grabmeier, et al., "Techniques of Cluster Algorithms in Data Mining", Data Mining and Knowledge Discovery, pp. 303-360, 2002, 58 pages, Kluwer Acedemic Publishers, The Netherlands.

* cited by examiner

TRANSFORM FOR OUTLIER DETECTION IN EXTRACT, TRANSFER, LOAD ENVIRONMENT

BACKGROUND

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well. Simultaneously, the use of data analysis tools has increased dramatically as society has become more dependent on databases and similar digital information storage mediums. Such information is typically analyzed, or "mined," to learn additional information regarding customers, users, products, and the like.

As such, much business data is stored in databases, under the management of a database management system (DBMS). A large percentage of overall new database applications have been in a relational database environment. Such relational database can further provide an ideal environment for supporting various forms of queries on the database. Accordingly, the use of relational and distributed databases for storing data has become commonplace, with the distributed databases being databases wherein one or more portions of the database are divided and/or replicated (copied) to different computer systems and/or data warehouses.

A data warehouse is a nonvolatile repository that houses an enormous amount of historical data rather than live or current data. The historical data can correspond to past transactional or operational information. Data warehousing and associated processing mechanisms (e.g., On-Line Analytical Processing (OLAP), Relational OLAP (ROLAP), Multidimensional OLAP (MOLAP), and Hybrid OLAP (HOLAP)) are widespread technologies employed to support business decisions and data analysis. Data warehouses are populated at regular intervals with data from one or more heterogeneous data sources, for example from multiple transactional or enterprise resource planning (ERP) systems. This aggregation of data provides a consolidated view of an organization from which valuable information can be derived. Though the sheer volume can be overwhelming, the organization of data can help ensure timely retrieval of useful information. For example, the organization of data in a data warehouse typically involves creation and employment of fact and dimension tables.

Extracting raw data from operational databases and a transform thereof into suitable or useful information is the function of these data warehouses and data marts. In such data warehouses and data marts, typically data is structured to satisfy decision support roles rather than operational needs. In general, before data is loaded into the target data warehouse or data mart, cryptic and conflicting codes should be resolved, and raw data translated into something more meaningful. Also, summary data that is useful for decision support, trend analysis or other end-user needs to be pre-calculated. Ultimately, the data warehouse in general consists of an analytical database containing data that facilitates decision support. Likewise, a data mart is similar to a data warehouse, and it further contains a subset of corporate data for a single aspect of business, such as finance, sales, inventory, or human resources. With data warehouses and data marts, useful information is retained at the disposal of the decision-makers.

One major difficulty associated with implementing data warehouses and data marts relates to cleansing of data. In general, noise associated with data can occur as data accumulates from a plurality of sources. For example values can be mistyped or misinterpreted form such sources. Moreover, typically after a merge between data sources outliers or dirty data are likely to remain undetected. Such anomalies can negatively affect user interaction with data warehouses.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for cleansing of data in Extract, Transform, Load environments (ETL), via employing an outlier detect component that is positioned in a data pipeline to data warehouse(s). Such outlier detect component employs a cluster mining model to split data into normal and outlier data. Different predictive models can be employed to detect outliers in different data slices to enhance the accuracy of the predictions. Outlier data can be excluded or alternatively replaced with default values. In platforms that can build data integration and workflow applications (e.g., integration services), the ETL process begins when data is extracted from specific data sources. The data is then transformed, using rules, algorithms, concatenations, or any number of conversion types, into a specific state. Once in this state, the transformed data is loaded into the Data Warehouse where it can be accessed for use in analysis and reporting. Such can also be employed to automate maintenance of Structured Query Language (SQL) server databases. Accordingly, the subject innovation introduces an outlier detect component in pipeline-based ETL architecture that is flexible, robust, and extensible in automating data cleansing of ETL throughput in data warehousing.

In a related aspect of the subject innovation, the cluster mining model can be a reference or predetermined cluster model (e.g., synchronized mode). As data is received by the outlier detect component, evaluations and/or prediction(s) can be subsequently executed based on the reference clustering model to measure a likelihood value or clustering distance. Moreover based on such likelihood value, incoming data can be bifurcated into normal data and outlier data. Settings for the cluster mining model can be based on a threshold value and/or percentage.

According to a further aspect of the subject innovation, a clustering mining model is being built as data is being received by the outlier detect component (e.g., asynchronized mode). All or a partial segment of the data can be employed in constructing such clustering model. To construct such cluster mining model on the fly, data mining can be employed in searching through large amounts of data received by the outliner detect component to uncover patterns and relationships contained therein. Thus, the outlier detect component can be trained to find patterns and locate anomalies and further predict or infer such outlier data. Various artificial intelligence models can be employed with the synchronized and asynchronized mode.

In a related aspect, a graphical user interface (GUI) can be employed in conjunction with the outlier detect component, to include a two or three dimensional image space. Such GUI enables a user to interact with cluster groups that are created and/or analyzed by the outlier detect component. One or more cluster indicators are provided in the image space to designate a cluster, which can include any number of objects or be empty (e.g., no associated objects). A plurality of graphical objects that are associated with desired data can also be visually associated with a cluster indicator to form a cluster or group. The association between cluster indicators and graphical objects can be based on the proximity of an object relative to the cluster indicators.

To further visually differentiate respective clusters, similar graphical features can be shared by the cluster indicator and graphical objects associated with the respective cluster indicator. For example, a color-coding scheme can be utilized so all objects in a given cluster include a uniquely color-coded graphical feature. Other graphical features can be employed to facilitate distinguishing different clusters. Cluster indicators also can be provided with labels (e.g., text, audio, and/or video) to help distinguish and identify the respective clusters.

To the accomplishment of the foregoing and related ends, certain illustrative aspects of the claimed subject matter are described herein in connection with the following description and the annexed drawings. These aspects are indicative of various ways in which the subject matter can be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Figure 1:
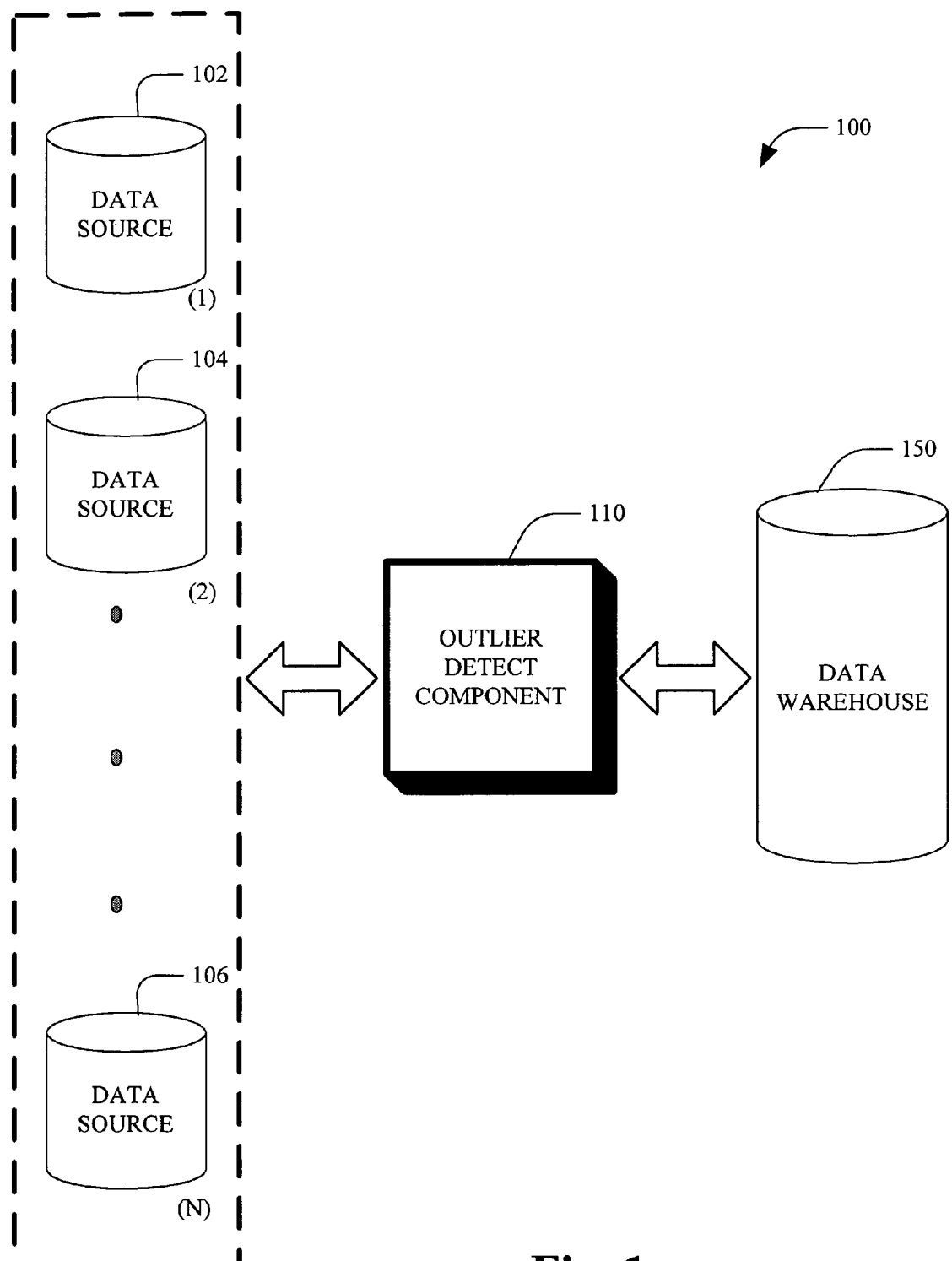
FIG. 1 illustrates a block diagram of an outlier detect component in an extract, transform, load (ETL) environment in accordance with an aspect of the subject innovation.

Turning initially to FIG. 1, a system 100 is illustrated that cleanses data in an extract, transform and load environment (ETL), via employing an outlier detect component 110. In general, the ETL process begins when data is extracted from specific data sources 102, 104, 106 (1 thru N, where N is an integer). The data is then transformed, using rules, algorithms, concatenations, or any number of conversion types, into a specific state. Once in this state, the transformed data can be loaded into the Data Warehouse 150 where it can be accessed for use in analysis and reporting. As such, the subject innovation introduces an outlier detect component 110 in a pipeline-based ETL architecture that is flexible, robust, and extensible in automating data cleansing of ETL throughput in data warehousing. With such data warehouse 150, a user can extract a wide variety of heterogeneous data, transform the data using SQL, and store the data for use in decision support.

Moreover, the data warehouse 150 enable users to explore data warehousing without building an enterprise-wide data warehouse. The data warehouse can access a variety of sources, including SQL server, flat files, and facilitates end user decision making, since such data warehouse 150 can be a data mart that contains data optimized for end user decision analysis. Additionally, operations relating to data replication, aggregation, summarization, or enhancement of the data can be facilitated via various decision support tools associated with the data warehouse 150. Furthermore, a plurality of business views that model structure and format of data can be implemented using an interface associated with the data warehouse 150.

In addition, the data warehouse 150 often represents data as a "cube" of three, four, or more dimensions. For example, a business can be modeled as a cube having three dimensions, corresponding real-world business distinctions such as, Product, Time, and Market, for example. Any point within such cube is at the intersection of the coordinates defined by the edges of the cube, and can be viewed as corresponding to a metric or measurement that is valid for the combination of dimension values that define the point. For example, such metrics can include "units sold," "price," and the like. Each point can also indicate price and units sold of a particular product, at a particular time or period, in a given market.

As described in detail infra, the outlier detect component 110 employs a cluster mining model to split data into normal and outlier data. Different predictive models can be employed to detect outliers in different data slices to enhance the accuracy of the predictions. Outlier data can be excluded or alternatively replaced with default values. Items clustered by properties of predictive models can be presented in a folder-like manner (or other display type), whereby automatic clusterization may be performed by a different or subsequent property to split or organize data received by the outlier detect component 110 into an easily manageable subset of clusters. These subsets may then be selected to retrieve desired information or to perform other clustering procedures (e.g., nested clusterization).

The outlier detect component 110 can employ a synchronized mode, wherein the cluster mining model can be a reference or predetermined cluster model. Moreover, the outlier detect component 110 can employ an asynchronized mode, wherein a cluster mining model is being built on the fly, as data is being received by the outlier detect component.

Figure 2:
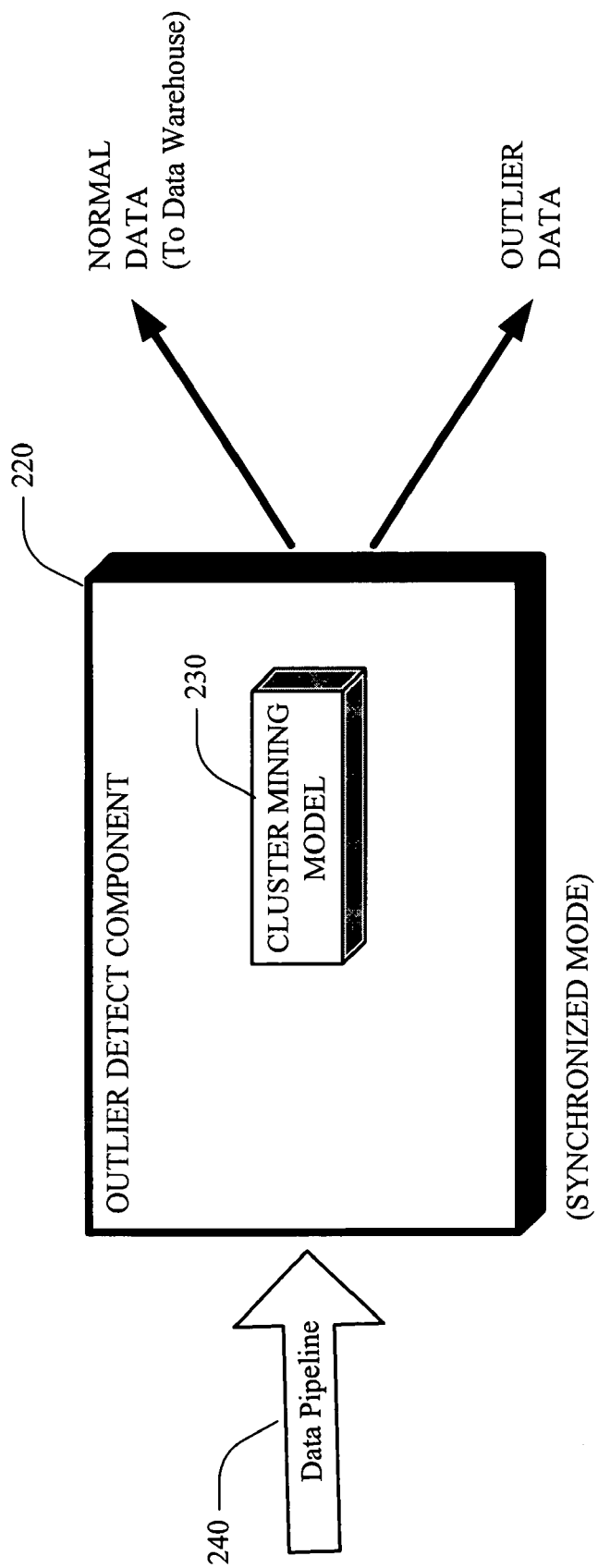
FIG. 2 illustrates a particular block diagram of an outlier detect component that employs a reference cluster mining model.

FIG. 2 illustrates a particular outlier detect component 220 as part of a cleansing system that operates in a synchronized mode in accordance with an aspect of the subject innovation. The outlier detect component 220 is positioned in a pipeline-based ETL architecture that is flexible, robust, and extensible in automating data cleansing of ETL throughput in data warehousing. System 200 can include a plurality of data storages (not shown) that merge data to be stored in a data warehouse (not shown). Data stored in the data storages can include documents, files, folders, images, audio files. Such files can also be associated with various properties (e.g., metadata) describing such aspects as an item's type (e.g., image, document, spreadsheet, binary, and so forth), date created, people associated with the item, location, category, user-defined property, and the like. The outlier detect component 220 receives the data and associated properties and presents such data to a cluster mining model 230 (e.g., a model based on SQL Server Data Mining technologies) that performs an analysis of respective items and properties. Subsequently, prediction is executed based on such cluster mining model 230 to measure a likelihood value or clustering distance. Moreover, based on the likelihood value incoming data can be bifurcated into normal data and outlier data. Settings for the cluster mining model 230 can be based on a threshold value and/or percentage. Data can be received by the outlier detect component 220 from a plurality of data stores, including a relational database, an SQL database, and the like.

As illustrated in FIG. 2, the outlier detect component 220 employs a cluster mining model 220 to bifurcate incoming data from a data pipeline 240 into outlier data and normal data. The cluster mining model 220 can be associated with a server (not shown) or combination of servers that houses data mining objects (not shown) associated therewith.

The data mining objects can be associated with patterns learned by the cluster mining model 220 with respect to data contemplated by such model. The server can further include an interface component (not shown) that enables such data mining objects to be accessed and operated on by way of stored procedures existent upon the server. The procedures can relate to formatting, normalization, or any other suitable procedure that can be undertaken by the stored procedures. As the procedures are stored upon the server, they can be re-used at a later instance without causing additional network traffic.

For instance, the interface component can facilitate loading the class library into memory of the server and couple such library with the infrastructure of the server. The class library of the interface component enables the data mining objects to be accessed according to rules and structure of the cluster mining model 230. Thus, based on the likelihood value, the data received by the outlier detect component 220 can be bifurcated into normal data and outlier data.

Figure 3:
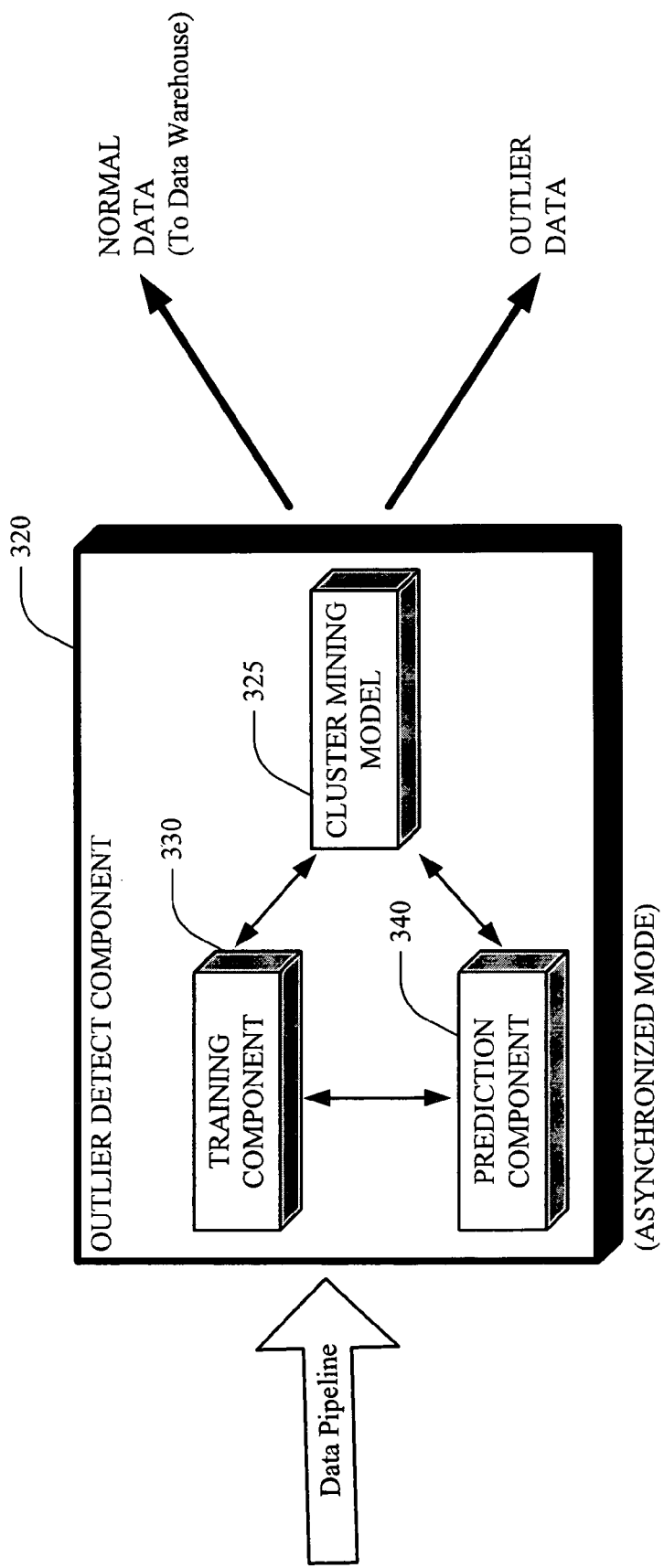
FIG. 3 illustrates a further block diagram of an outlier detect component that employs a cluster mining model built as data is being received by the outlier detect component.

FIG. 3 illustrates a further exemplary aspect of the subject innovation, wherein a cluster mining model 325 is being built as data is being received by the outlier detect component 320 (e.g., in an asynchronized mode). All or a partial segment of the data can be employed in constructing the cluster mining model 325, where data mining can be employed in searching through large amounts of data received by the outliner detect component 320 to uncover patterns and relationships contained therein. As illustrated in FIG. 3, the outlier detect component 320 can include a training component 330 and a prediction component 340. The training component 330 can employ machine-learning techniques while analyzing incoming data to continuously improve and/or correct the data mining model that is being created on the fly. Thus, the outlier detect component 320 can be trained to find patterns and locate anomalies.

Additionally, within the cluster mining model 325 there can exist one or more parameter(s) as well as one or more algorithms that are utilized to generate predictions, via the prediction component 340. Such prediction component 340 can issue command(s) relating to obtaining a prediction from the cluster mining model 325 on the fly. In accordance with one aspect of the subject innovation, the command(s) can be in a declarative language utilized in connection with data mining, such as Data Mining Extension (DMX). The command(s) can utilize a singular statement regardless of type of prediction desired. For instance, systems/methods for obtaining a prediction typically utilize disparate predict statements for different prediction types. In a specific example, DMX includes commands for predicting with respect to sequence data, predicting with respect to time-series data, and predicting with respect to associative membership data, hence further predicting or inferring the outlier data. A threshold probability can be specified for categorizing data as outlier data. For example, the prediction component 340 can employ a Bayesian network modeling with probability determination features. Such Bayesian network modeling can receive the threshold properties for designation of outlier data, and models the joint probability distribution of the anomaly by learning a Bayesian network over data received by the outlier detect component 320. Various constraints and/or other data can be utilized by the Bayesian network modeling component when constructing the data mining model.

In a related aspect artificial intelligence (AI) components can be employed to facilitate detection of outlier data in accordance with an aspect of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 4:
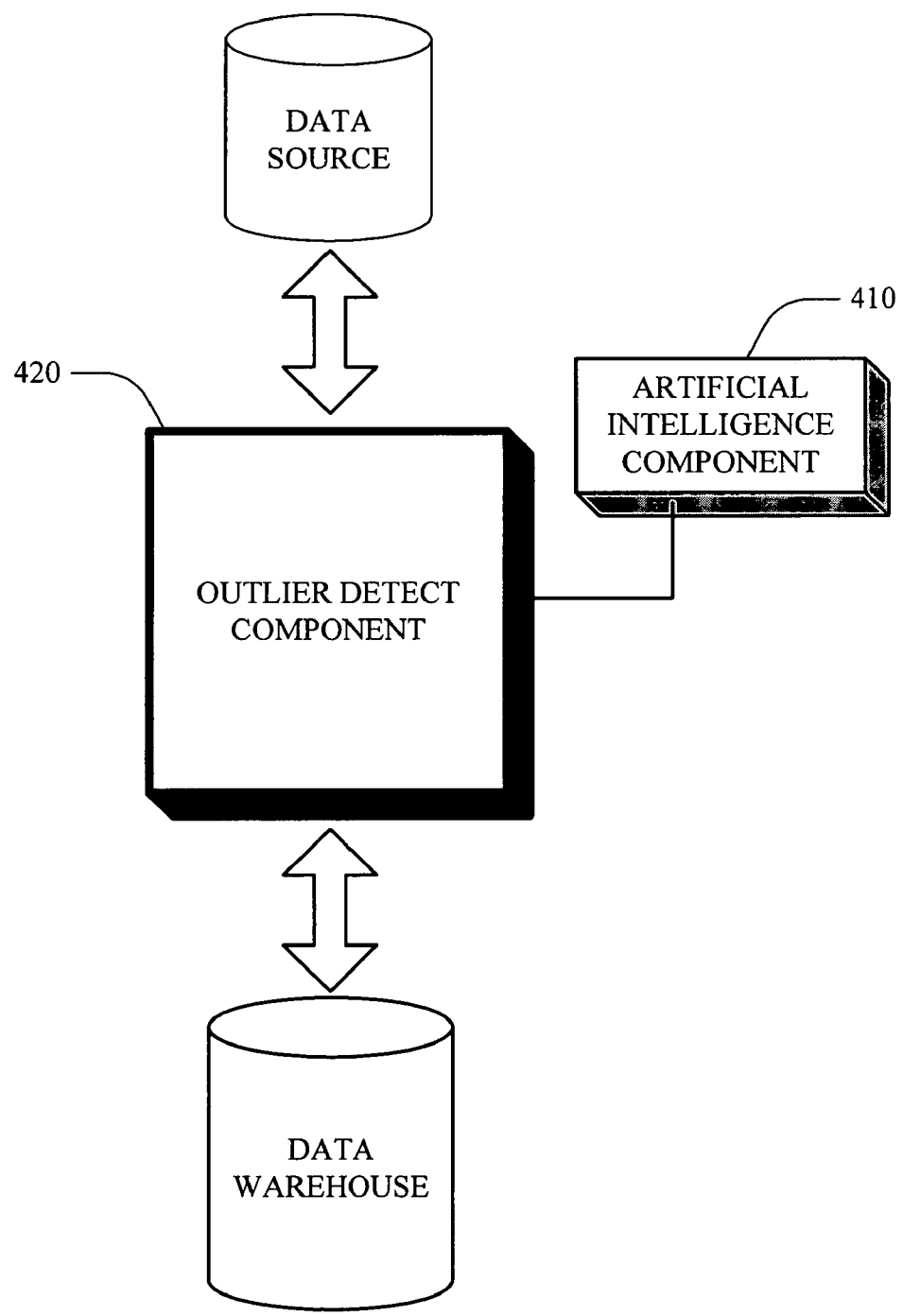
FIG. 4 illustrates an exemplary block diagram of a system that employs an artificial intelligence component operatively connected to the outlier detect component.

FIG. 4 illustrates an artificial intelligence component 410 that can interact with the outlier detect component 420 to facilitate detection of outlier data in accordance with an aspect of the subject innovation. For example, a process for determining outlier data in a synchronized mode and an asynchronized mode can be facilitated via an automatic classifier system and process. A classifier is a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 5:
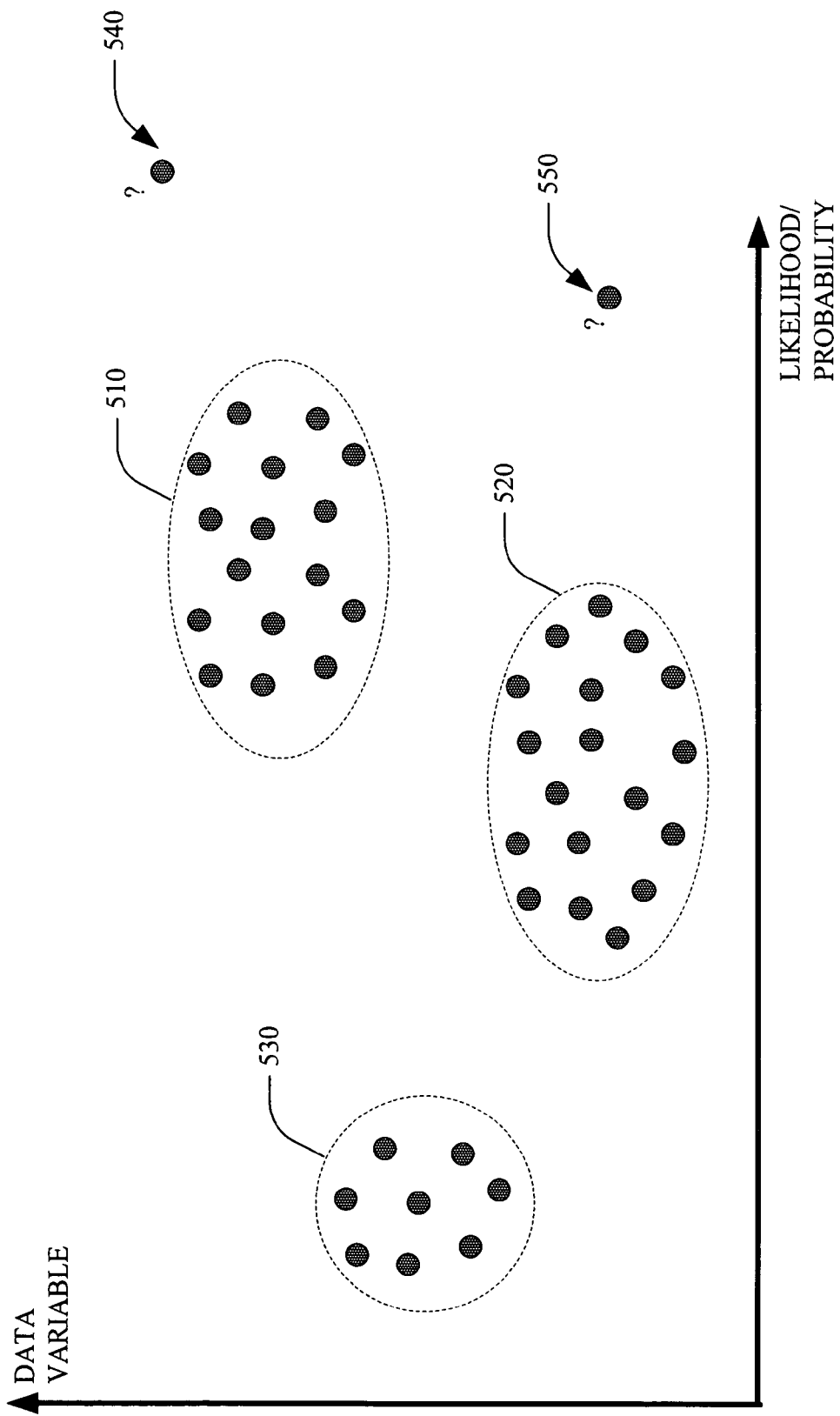
FIG. 5 illustrates an exemplary graph for clustering applied to a data variable in accordance with an aspect of the subject innovation.

FIG. 5 illustrates an exemplary graph for clustering that is applied to a data variable in accordance with an aspect of the subject innovation. The data variable can include annual income for particular professionals within a specific affluent locality, for example. As described in detail supra, based on the data mining model clustering algorithms can assign each given case to the closest cluster center based on the distance (similarity to the cluster center and/or probability to being located within a specified threshold), such as clusters 510, 520, 530. As illustrated in FIG. 5, points 540, 550, indicate points that are too far away to any of the cluster centers, and are unlikely to fall within clusters 510, 520, and 530. For example, data that indicates an annual salary of $1 in the affluent locality indicates an anomaly. Similarly, data that indicates a salary of 1 billion dollars indicates an anomaly on the other extreme.

Figure 6:
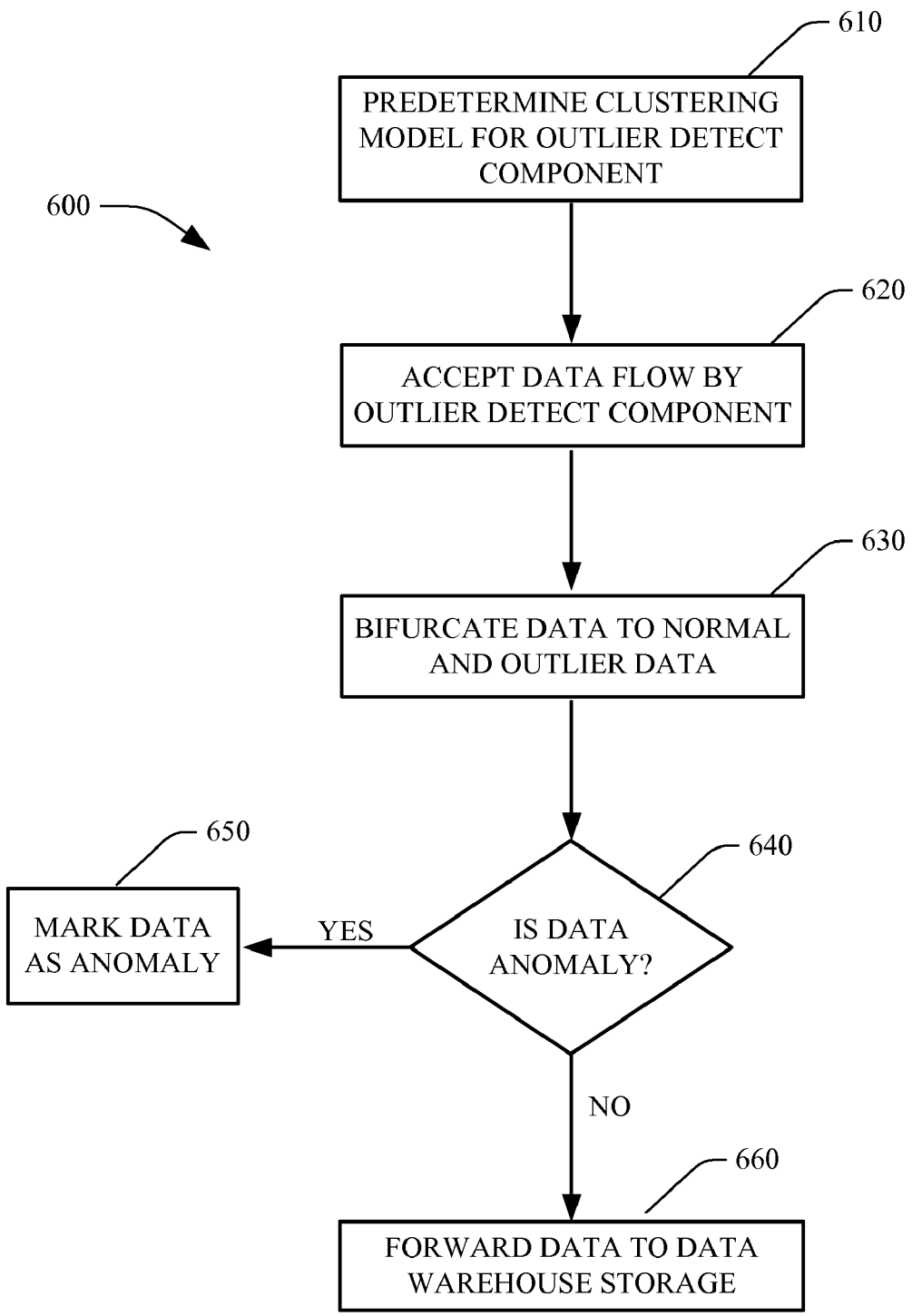
FIG. 6 illustrates a related methodology of anomaly detection in a synchronized mode in accordance with an aspect of the subject innovation.

FIG. 6 illustrates a related methodology 600 of anomaly detection in a synchronized mode in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 610 a predetermined cluster mining model can be selected for the outlier detect component, as described in detail infra. Such selection of the cluster mining model as a reference model can in part be based on type of data and the storage medium that data is being received from by the outlier detect component. In addition, settings for the cluster mining model can be based on a threshold value and/or percentage. At 620, data is being received by the outlier detect component and analyzed based on the cluster mining model. Based on such analysis, the data can be bifurcated to normal data and outlier data, at 630. A determination can be performed at 640 to determine if data is found to be outlier data. If so, the methodology 600 proceeds to 650, where data can be marked as anomaly and/or removed from the data flow. Alternatively and if no anomaly is detected, the methodology 600 proceeds to act 660 where data is forwarded to a data warehouse for storage.

Figure 7:
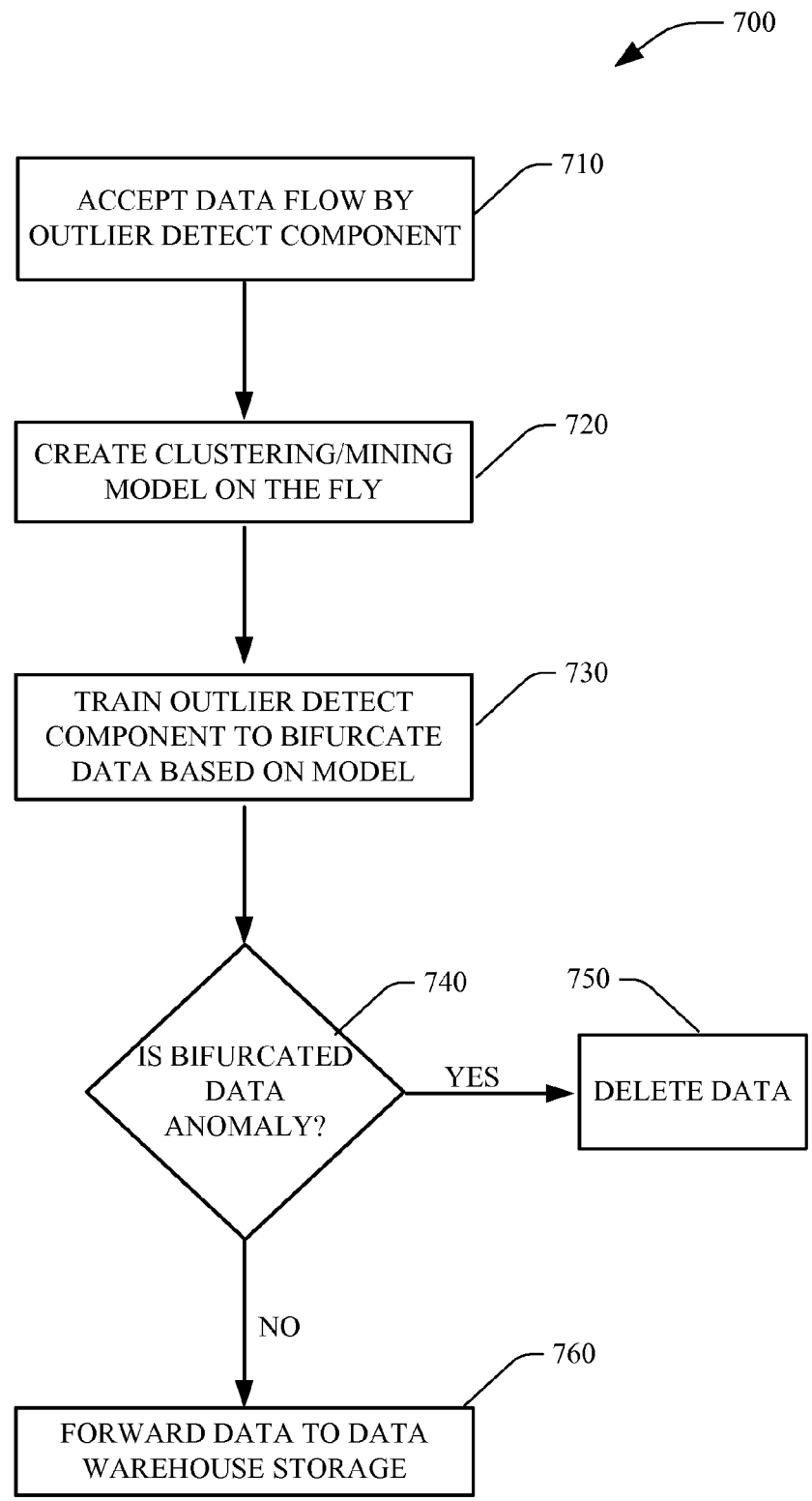
FIG. 7 illustrates a methodology for anomaly detection in an asynchronized mode in accordance with a particular aspect of the subject innovation.

FIG. 7 illustrates a related methodology 700 of anomaly detection in an asynchronized mode in accordance with a particular aspect of the subject innovation. Initially, and at 710, data is being received by the outlier detect component and a cluster mining model is being built at 720 as data is being received by the outlier detect component. All or a partial segment of the data can be employed in constructing such clustering model. For example, to construct such model, data mining can be employed in searching through large amounts of data received by the outliner detect component to uncover patterns and relationships contained therein. Subsequently, and at 730, the outlier detect component can be trained to find patterns and locate anomalies and further predict or infer such outlier data. For example, the model and/or transform can evaluate distance (e.g., likelihood) of each input row, and then splits the data out based on the distance value. At 740 a determination is performed, to determine if data is found to be outlier data. If so, the methodology 700 proceeds to 750, where data can be removed from the data flow. Alternatively and if no anomaly is detected, the methodology 700 proceeds to act 760 where data is forwarded to a data warehouse for storage.

Figure 8:
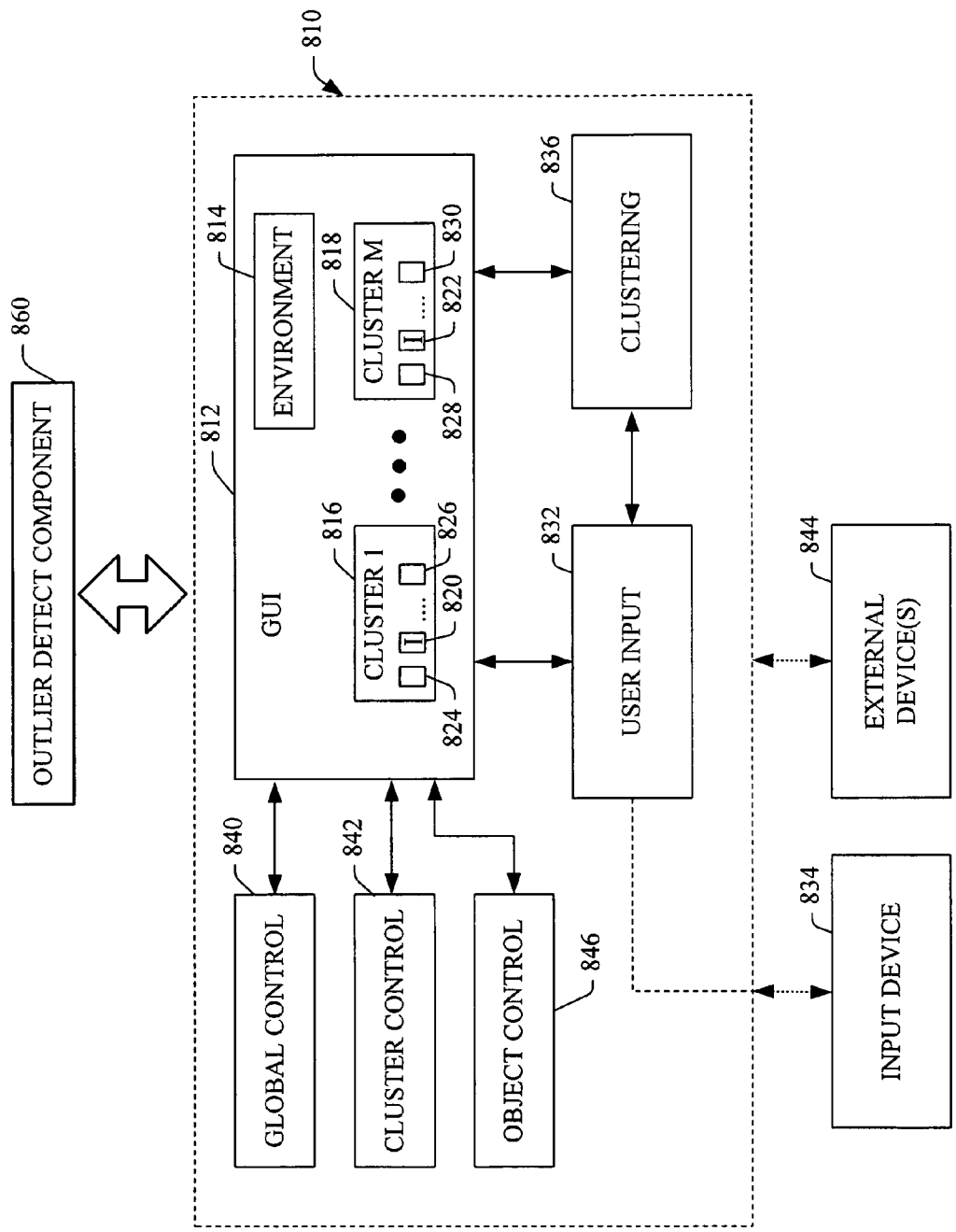
FIG. 8 illustrates a block diagram of a Graphical User Interface (GUI) system in conjunction with an outlier detect component, for managing various types of data in accordance with an aspect of the subject innovation.

In a related aspect, a graphical user interface (GUI) can be employed in conjunction with the outlier detect component, to include a two or three dimensional image space. Such GUI enables a user to interact with cluster groups analyzed and/or created by outlier detect component 860. FIG. 8 illustrates a block diagram of a system 810 in conjunction with an outlier detect component 860, for managing various types of data via a graphical user interface 812 in accordance with an aspect of the subject innovation. The graphical user interface 812 includes a graphical environment 814, which can provide a graphical representation of a three-dimensional image space. The GUI environment 814 alternatively could be a two-dimensional image space. For example, the environment 814 can be in the form of a surface, such as a plane, curved surfaces or other arrangement of three-dimensional image space. The GUI 812 also includes one or more clusters 816 and 818, indicated as CLUSTER 1 to CLUSTER M, where M is an integer, which are formed by the mining model of the outlier detect component 860. Each cluster 816, 818 includes a respective indicator object 820, 822 that provides a marker to identify the respective cluster. For example, the indicator objects 820 and 822 can include graphical elements displayed in the image space of the GUI 812. The cluster indicators 820 and 822 can include respective annotations (e.g., audio or textual label) that further identify a characteristic or name of the respective clusters 816 and 818.

Each cluster 816, 818 also can include any number of graphical objects 824, 826 and 828, 830. The graphical objects 824, 826, 828 and 830 can be programmatically associated with data, which can include textual data, image data, video data and/or audio data. The objects 824 and 826 can be visually associated with the indicator 820 of the cluster 816. Similarly, graphical objects 828 and 830 can be visually associated with the cluster indicator 822 of the cluster 818. In accordance with an aspect of the subject innovation, the visual association between graphical objects 824-830 and corresponding indicator objects 820 and 822 can occur dynamically based on the proximity of the graphical objects and the indicator objects in the image space of the GUI 812. For example, the graphical objects can be dynamically associated with any indicator automatically based on the visual distance in the image space 812 between the object and the respective indicators 820 and 822. Additionally, the graphical objects 824-830 can also be associated with the closest cluster indicator, wherein association can be implemented automatically during movement of a respective graphical object. A threshold distance can be implemented such that if a graphical object is more than the threshold distance away from any cluster indicator, the object may remain unassociated with any cluster. In addition, it may be desirable to prevent changes in cluster membership where one or more entire clusters are being moved relative to the image space environment 814.

In order to effect desired interactions between clusters 816 and 818, graphical objects 824-830 and cluster indicators 820 and 822, the system 810 can employ a user input 832, such as provided by a user input device 834. The user input device 834 can be a pointing device, a keyboard, a touch screen, a touch pad, an audio input, or other input device capable of entering user data into the system. For example, the user input 832 can be provided based on the location of a pointer, cursor or other graphical object that is moveable on a computer screen or display. The pointer appears to move relative to the GUI. The pointer thus can be utilized to select or deselect one or more clusters and, in turn, effect movement of the selected cluster, such as based on the position of the pointer and other input provided with the input device 834. When a cluster 816 or 818 is selected and moved, typically all objects associated with that cluster can move accordingly in the image space 812. Similarly, the user input 832 also can be utilized to select or deselect one or more graphical objects 824, 826, 828 or 830. It is to be appreciated that plural objects can be selected within a single cluster or in multiple clusters.

For example, an object 826 can be moved from the cluster 816 to another cluster 818 by appropriate requests provided by the user input 832. In accordance with an aspect of the subject innovation, as the object 826 is being moved in the image space of the GUI 812 towards the cluster 818, the object is dynamically visually associated with the other cluster 818. The association can occur in response to determining that the relative distance between the object 826 and the cluster indicator 822 is less than the distance between that object and the cluster indicator 820 of its previously associated cluster 816.

To further facilitate visualization of an association between objects and their corresponding clusters, the objects in each respective cluster can share a common banner. The banner, for example, can be a color-coded graphical feature (e.g., a strip or halo) extending along a portion of the graphical object. Thus, each cluster can be assigned a different color code that can be applied to the graphical objects and cluster indicator in each respective cluster. Thus, continuing with the above example, as the object 826 moves from the cluster 816 to the cluster 818, the banner of the graphical object 826 changes to reflect the change in cluster association or membership.

The system 810 also includes a clustering control 836 operative to implement the visual association and membership of graphical objects relative to the clusters 816 and 818. The clustering control can implement an algorithm that determines cluster membership as a function of the relative distance between the respective graphical objects and the cluster indicators. For example, the distance can be a linear two-dimensional distance (e.g. screen) distance between an adjacent portion of the graphical object and a nearest portion of the cluster indicator. The distance can also be a simulated three-dimensional distance, such as for situations where the image space of the GUI 812 is a three-dimensional, graphical representation. In a three-dimensional case, scaling (or mapping) also can be implemented such that the threshold distance used for determining cluster membership is scaled according to the locations of the respective objects.

In order to perform desired operations relative to the image space as a whole, the system 810 can include a global control 840 that can be activated via an appropriate user input 832 provided relative to image space 812. The global control 840 can provide a menu of options that can be utilized, for example, to import additional graphical objects into the image space, to create a new cluster, or to arrange the clusters in a predetermined manner. The global control 840 also can include a scaling function that can be selected to adjust the relative size of the graphical objects and indicators relative to the environment 814. For example, it may be desirable to scale the graphical objects and cluster indicators without any associated scaling of the environment 814. In addition, in situations when the scaling is being applied to accommodate additional graphical objects and clusters in the image space 812 (e.g., a reduction in scaling), it may be desirable to scale the graphical objects 824-830 a greater amount proportional to the relative scaling of the cluster indicators 820 and 822.

A cluster control 842 can be associated with each cluster 816, 818 to perform desired operations relative the respective clusters. The cluster control, for example, provides a pop-up menu of available options, although other formats could be used to display the options (e.g., a tool bar menu). The particular options available with the cluster control 842 can vary depending on the types of data represented by the graphical objects of the respective cluster. Some possible operations include sending the cluster (including all associated objects) to one or more external devices 844. The external devices 844 can be hardware and/or software, such as associated applications that are able to utilize the graphical objects or any of its associated data.

An object control 846 also can be employed to perform desired operations relative to the graphical objects 824, 826, 828 and 830. The object control 846, for example, provides a menu of options that can be implemented on the objects. The object control 846 can be activated through the user input 832, such as for a selected object. The object control 846 can enable a user to annotate a selected object, view details of the object, or send the object to an application or to one or more external devices 844.

Figure 9:
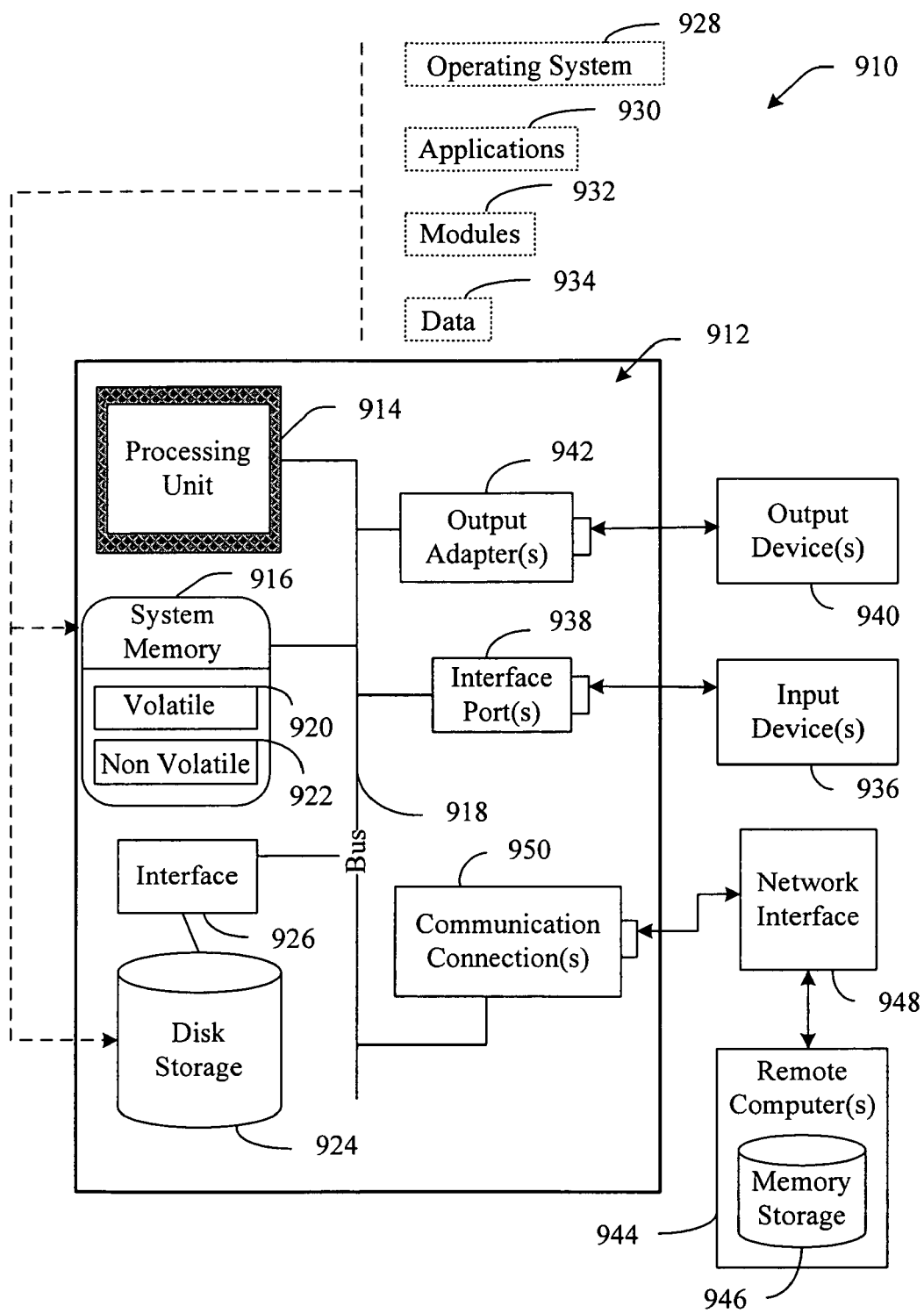
FIG. 9 illustrates an exemplary environment for implementing various aspects of the subject innovation.
Figure 10:
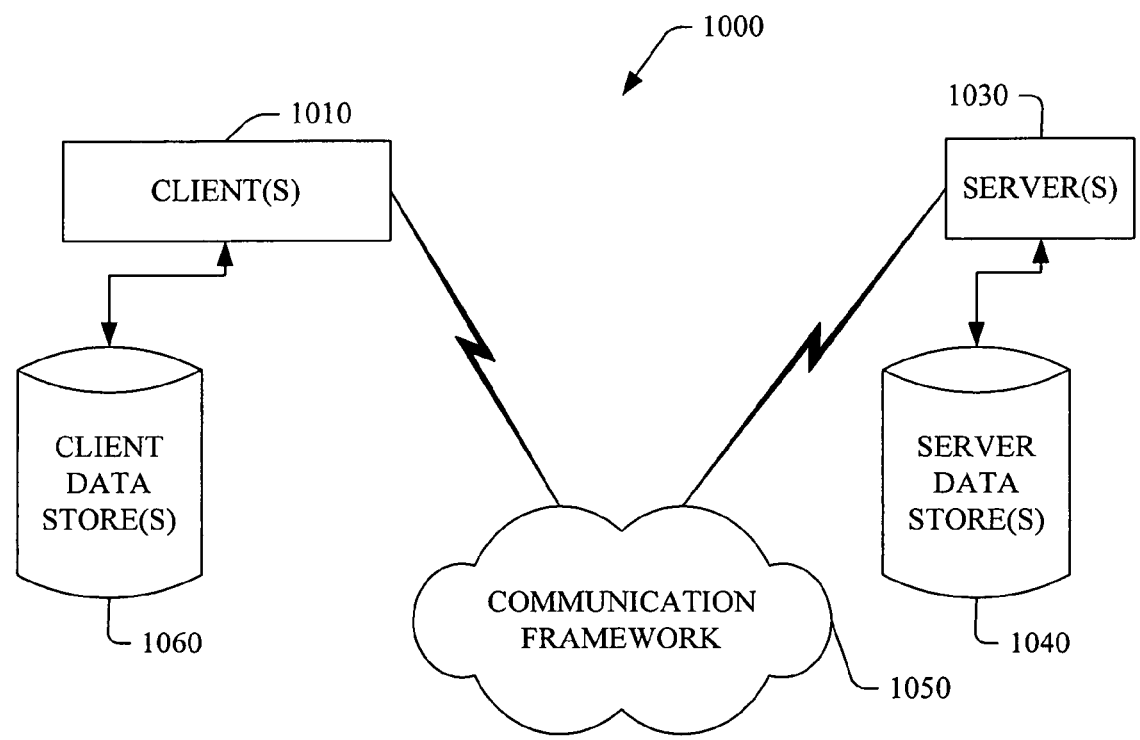
FIG. 10 is a schematic block diagram of an additional-computing environment that can be employed to implement the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed to designate data anomalies in an ETL environment in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data cleansing, the system comprising:
    a processor;
    a memory communicatively coupled to the processor, the memory having stored therein computer-executable instructions configured to implement the system, including:
    a data warehouse that stores data from a plurality of data sources in an extract, transform and load (ETL) environment; and
    an outlier detect component that receives data from the data sources and bifurcates the data into normal and outlier, wherein the normal data is subsequently loaded into the data warehouse, and the outlier data is excluded from the data warehouse, wherein the outlier detect component utilizes a cluster mining model that detects patterns in the received data, clusters the received data in accordance with the detected patterns, and identifies a subset of the received data that does not fit into any of the clusters as outlier data.

2. The system of claim 1, the cluster mining model selected based on at least one of the type of data received or the storage medium of the data source from which the data is received.

3. The system of claim 1, the outlier detect component includes a training component that analyzes data received by the outlier detect component and continuously modifies the cluster mining model based on the analysis.

4. The system of claim 3, the outlier detect component is part of an integration services environment that supplies a platform to build data integration and workflow applications.

5. The system of claim 1, the data sources in the ETL environment are SQL databases.

6. The system of claim 1, the outlier detect component employs an artificial intelligence component that applies an automatic classifier system to detect outlier data from the received data.

7. The system of claim 1 further comprising a GUI that includes at least one of a two or three dimensional image space that facilitates user interaction with data clusters created and analyzed by the outlier detect component.

8. The system of claim 7 further comprising an identification indicator associated with each data cluster.

9. The system of claim 8, wherein a data item is associated with a data cluster when the data item is within a threshold distance from the data cluster in the image space.

10. The system of claim 9, the GUI allows a user to re-associate the data item from a first data cluster to a second data cluster.

11. The system of claim 10 further comprising a global control that adjusts relative sizes of graphical objects and indicators relative to the data clusters.

12. A method that facilitates data cleansing, comprising:
    employing a processor executing computer-executable instructions stored on a computer-readable storage medium to implement the following acts:
    receiving a flow of data at an outlier detect component;
    analyzing the received data to detect patterns using a cluster mining model;
    classifying a first subset of the received data that does not belong to any of the detected patterns as outlier data;
    classifying a second subset of the received data that fits into the detected patterns as normal data;
    forwarding the normal data to a data warehouse; and
    excluding the outlier data from storage in the data warehouse.

13. The method of claim 12 further comprising:
    creating the cluster mining model as the data is received; and
    continuously adjusting the cluster mining model as the data is received based on an analysis of the received data using machine-learning techniques.

14. The method of claim 13 further comprising training the cluster mining model to find patterns and locate anomalies in the data.

15. The method of claim 14 further comprising predicting anomalies in the data.

16. The method of claim 12 further comprising assigning a data item in the received data to a data cluster based on a distance of the data item from a cluster center.

17. The method of claim 14 further comprising employing an artificial intelligence to locate the anomalies in the received data.

18. The method of claim 14 further comprising replacing the outlier data with default data for storage in the data warehouse.

19. The method of claim 14 further comprising receiving user input to manually create a new data cluster and to manually associated data with the new data cluster.

20. A system comprising computer-executable components embodied on a computer-readable storage medium that, when executed on one or more processors, facilitates data cleansing, comprising:

means for receiving data from a plurality of data sources in an extract, transform and load (ETL) environment;

means for building a cluster mining model based on the type of data received;

means for detecting patterns in the received data using the selected cluster mining model;

means for clustering the received data according to the detected patterns;

means for categorizing a subset of the received data that does not fit into any of the clusters as outlier data;

means for categorizing the clustered data as normal data;

means for sending the normal data to a data warehouse for storage;

means for replacing the outlier data with default values; and means for sending the replacement default values to the data warehouse for storage.

* * * * *